W. J. COWAN.
Potato Digger.
No. 82,806. Patented Oct. 6, 1868.
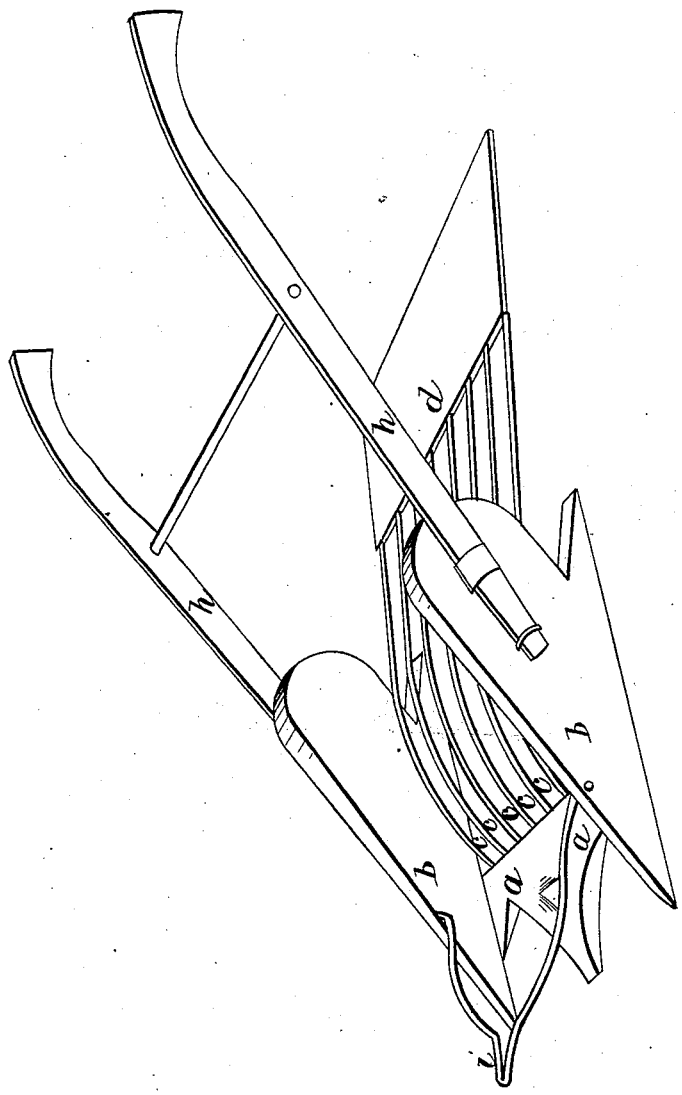

United States Patent Office.

WILLIAM J. COWAN, OF CORTLAND, NEW YORK.

Letters Patent No. 82,806, dated October 6, 1868.

IMPROVEMENT IN POTATO-DIGGERS.

The Schedule referred to in these Letters Patent and making part of the same.

TO ALL WHOM IT MAY CONCERN:

Be it known that I, WILLIAM J. COWAN, of Cortland, in the county of Cortland, and State of New York, have invented a new and useful Improvement in Apparatus for Digging Potatoes; and I do hereby declare that the following is a full, clear, and exact description of the construction and operation of the same, reference being had to the annexed drawings, making a part of this specification, in which the device is represented in perspective.

$b\ b$ are two side pieces, set parallel with each other upon a flat bottom-piece or share, $a$, the point of the share $a$ projecting slightly beyond the points of the sides, and dropping below them.

$c\ c$ are rods, running from the rear end of the share back to and connecting with the apron $d$, and forming a screen. These rods are so bent as to form a curve between the share and apron, thus making a space underneath for the dirt to fall and separate itself from the potatoes.

$h\ h$ are handles, by which to manage and guide the apparatus.

$i$ is a bail or chain, to which the team is hitched.

The apparatus or machine is intended to be of sufficient width to span or take in an entire potato-hill. As it is moved forward, the share enters and passes under the bottom of the hill; the whole hill, dirt and potatoes, must then pass out through and over the rods or screen, as the side pieces prevent the escape of either in any other way. The jar or motion of the machine through the ground is sufficient to separate the dirt from the potatoes on the screen, and they are thus delivered over the apron and left on the surface of the ground, which is first smoothed down for them by the apron in its passage over it.

What I claim, and desire to secure by Letters Patent, is—

The combination of the sides $b\ b$, the point or share $a$, and the curved rods $c\ c$, with the apron $d$, when constructed substantially as above described, and for the uses and purposes set forth.

WM. J. COWAN.

Witnesses:
CHAS. FOSTER,
R. H. DUELL.